Edw'd Braggins
Seeder and Cultivator.

116678

PATENTED JUL 4 1871

Witnesses
Jno. A. Ellis
P. White

Inventor
Edward Braggins
J. K. Alexander
Atty

UNITED STATES PATENT OFFICE.

EDWARD BRAGGINS, OF MOUNT VERNON, OHIO.

IMPROVEMENT IN COMBINED CORN-PLANTERS AND CULTIVATORS.

Specification forming part of Letters Patent No. 116,678, dated July 4, 1871.

*To all whom it may concern:*

Be it known that I, EDWARD BRAGGINS, of Mount Vernon, in the county of Knox and State of Ohio, have invented certain new and useful Improvements in Combined Corn-Planter, Cultivator, Grain-Drill, Potato-Digger, and Hay-Rake; and I do hereby declare that the following is a full, clear, and exact description thereof, reference being had to the accompanying drawing and to the letters of reference marked thereon which form a part of this specification.

The nature of my invention consists in the construction and arrangement of a seeder and cultivator with hay-rake attached, as will be hereinafter fully set forth.

In order to enable others skilled in the art to which my invention appertains to make and use the same, I will now proceed to describe its construction and operation, referring to the annexed drawing, in which—

Figure 1:
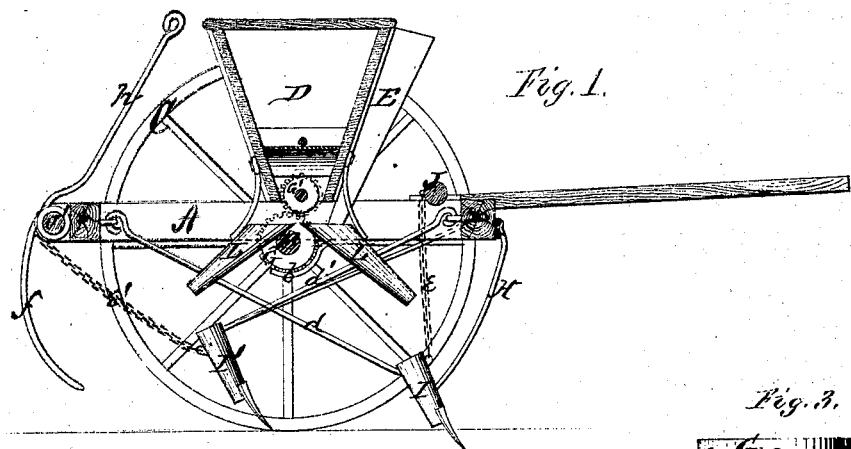
Figure 2:
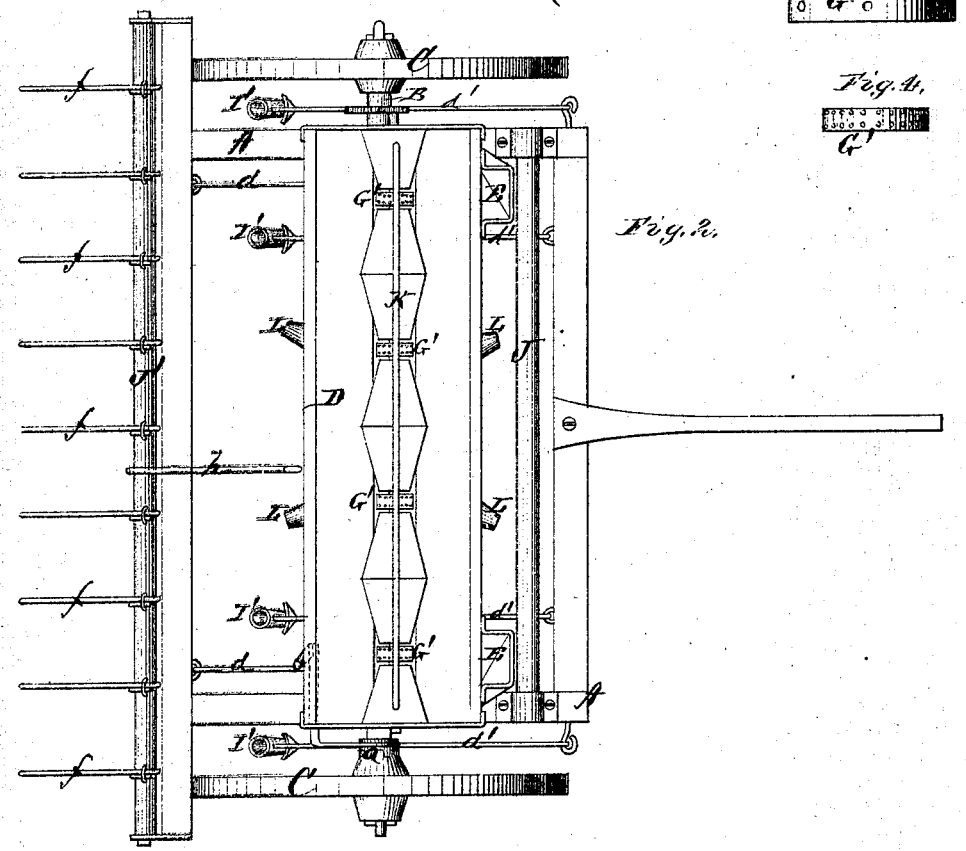
Figure 3:
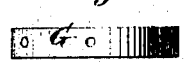
Figure 4:
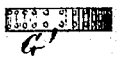

Figure 1 is a transverse vertical section, and Fig. 2 a plan view of my machine. Fig. 3 is an enlarged plan view of the wheel which plants the corn, and Fig. 4 is an enlarged plan view of the seed-planting wheel.

A represents the frame of my machine, and B is the axle which passes through suitable journal-boxes on the under side of the frame. On each end of the axle B is placed a wheel, C, provided each with a clutch-gear, $a$, so that either one, or both together, may be made to turn the axle B. On the upper side of the frame A is placed the seed-box D, upon the front side of which are affixed the corn-hoppers E E. On the axle B, directly under each of the hoppers E, is placed a wheel or roller, G, provided with a series of holes on its outer periphery a suitable distance apart for conducting the corn from the hopper and depositing it in the ground. Along the front and lower side of each wheel G is a guard, $b$, which retains the corn in the recesses on said wheel, and only lets it fall at the rear end of the guard, thus preventing it—*i. e.*, the corn—from becoming scattered, but deposits it at regular intervals. In the center of the front end of the frame A is attached a brace, H, which connects two plows, I I, each of which is connected by a rod, $d$, with the rear end of the frame, and by a chain, $e$, with a roller, J, at the front end thereof. These plows I I make the furrow in which the corn is to be dropped, while other plows I' I', one on each side and in rear of the corn-dropper wheel, cover it up. These latter plows I' I' are, by rods $d'$ $d'$, connected with the front end of the frame, and by chains $e'$ $e'$ with a roller, J', at the rear end thereof. Within the seed-box D, and running lengthwise in the same, is a shaft, K, upon which is placed any desired number of seed-wheels G', which have two series of holes or recesses in their outer periphery, as shown in Fig. 4. Under each of these seed-wheels or rollers are placed two seed-conductors, L L, arranged to conduct the seed, one forward and the other to the rear of the seed-box. These conductors are further so arranged with reference to the seed-wheel above them that one of the series of holes in the wheel will deposit the seed in one conductor, while the other series of holes will deposit in the other conductor. When used as a seed-drill the plows I and I' are changed to correspond.

Motion is communicated to the shaft K by means of a pinion on one end thereof gearing with a cog-wheel on the axle B. When the machine is used as a corn-dropper this pinion is, of course, removed. The roller J', at the rear end of the frame A, extends beyond the wheels C C, the rear end of the frame being extended for that purpose, and to said roller is attached a series of rake-teeth, $f$ $f$, making a very convenient and simple hay-rake on the same carriage. To the head or roller J' is also attached a lever, $h$, by means of which the rake is operated. This machine may also conveniently be used as a potato-digger.

Having thus fully described my invention, what I claim as new, and desire to secure by Letters Patent, is—

The arrangement, upon one frame, of the seed-drill device D G' L, the corn-dropper device E G, the movable plows I I', and the rake J' $f$, all substantially as herein set forth.

In testimony that I claim the foregoing as my own I hereby affix my signature in presence of two witnesses.

EDWARD BRAGGINS.

Witnesses:
C. ALEXANDER,
JAS. V. WHITE.